(12) United States Patent
Sampaio

(10) Patent No.: US 11,511,202 B2
(45) Date of Patent: Nov. 29, 2022

(54) PORTABLE FOLDING VIDEO GAME CHAIR

(71) Applicant: Andre Sampaio, Valley Cottage, NY (US)

(72) Inventor: Andre Sampaio, Valley Cottage, NY (US)

( * ) Notice: Subject to any disclaimer, the term of this patent is extended or adjusted under 35 U.S.C. 154(b) by 61 days.

(21) Appl. No.: 17/327,676

(22) Filed: May 22, 2021

(65) Prior Publication Data

US 2021/0379498 A1 Dec. 9, 2021

Related U.S. Application Data

(60) Provisional application No. 63/035,212, filed on Jun. 5, 2020.

(51) Int. Cl.
*A63F 13/98* (2014.01)
*A47C 4/28* (2006.01)
*A63F 13/245* (2014.01)
*A47C 1/00* (2006.01)
*A47C 7/62* (2006.01)

(52) U.S. Cl.
CPC ............... *A63F 13/98* (2014.09); *A47C 1/00* (2013.01); *A47C 4/28* (2013.01); *A47C 7/62* (2013.01); *A63F 13/245* (2014.09)

(58) Field of Classification Search
CPC ........ A63F 13/245; A63F 13/80; A63F 13/98; A47C 4/28; A47C 1/00; A47C 7/62; G07F 17/3216; G07F 17/3218
See application file for complete search history.

(56) References Cited

U.S. PATENT DOCUMENTS

| | | | |
|---|---|---|---|
| 8,794,698 B2 | 8/2014 | Halsey | |
| 2005/0255925 A1* | 11/2005 | Brase | A63F 13/245 463/47 |
| 2006/0082198 A1* | 4/2006 | Mafrice | A47C 1/146 297/217.4 |
| 2011/0043006 A1* | 2/2011 | Butt | A47C 7/723 297/217.3 |

(Continued)

FOREIGN PATENT DOCUMENTS

EP 2702902 3/2014

*Primary Examiner* — Omkar A Deodhar
(74) *Attorney, Agent, or Firm* — Patentfile, LLC; Bradley C. Fach; Steven R. Kick

(57) ABSTRACT

A portable folding video game chair may include a backrest frame, a seating frame, a collapsible sling chair, a steering wheel controller column, a steering wheel controller shaft, a pedal controller frame, and a quick release pedals controller support. The backrest frame and seating frame may be pivotally coupled to each other. The collapsible sling chair may be coupled to the backrest frame and seating frame. The steering wheel controller column may be pivotally coupled to the seating frame and also movably coupled to the steering wheel controller column. The pedal controller frame may be pivotally coupled to the backrest frame and/or to the steering wheel controller. The quick release pedals controller support may have a pedals controller support aperture, and the quick release pedals controller support may be movably coupled to pedal controller frame by inserting a first and second pedal controller rail through a pedals controller support aperture.

20 Claims, 12 Drawing Sheets

(56) References Cited

U.S. PATENT DOCUMENTS

2011/0254327 A1* 10/2011 Halsey .................... A47C 7/50
                                                        297/188.15
2013/0059667 A1*  3/2013 Nadal Berlinches .......................
                                                        A63F 13/803
                                                        463/47

* cited by examiner

PORTABLE FOLDING VIDEO GAME CHAIR

CROSS REFERENCE TO RELATED APPLICATIONS

This application claims priority to and the benefit of the filing date of U.S. Provisional Application No. 63/035,212, filed on Jun. 5, 2020, entitled "FOLDABLE VIDEO GAME CHAIR", which is hereby incorporated by reference in its entirety.

FIELD OF THE INVENTION

This patent specification relates to the field of folding video game chairs. More specifically, this patent specification relates to an improved portable folding video game chair for car racing and flight simulation that supports game controllers and that enables different simulation positions for the user.

BACKGROUND

The video game industry conveys player's mind from real world to a virtual world. For car racing or flight simulation games, the prior art has offered many options to increase greatly immersion and realism. Apparatus like; steering wheel and pedal controllers set with force feedback, joysticks, controller stands, and video game chairs are important contributors for it.

The prior art also recognized the demand of having portable folding video game chair in an effort to reduce shipping cost and concealing at home. The portable folding video game chairs are shipped disassembled aiming to have a reduced shipment cost, therefore, requiring assembly by the video gamer on its first use. One example is illustrated in Halsey, U.S. Pat. No. 8,794,698, issued in Oct. 20, 2011. Halsey provides a collapsible simulator chair apparatus, which after assembled, requires the steering wheel to be unlatched and rotated to allow the player to seat in the chair.

However, the bulkiness of the apparatus has been inconvenient to households when it needs to be concealed in very narrow spaces. The prior art failed to present a portable folding video game chair compact enough to place it in niche spaces.

Another example of an existing video game chair is illustrated by Berlinches and Tejera et al., EP2702902A1, issued Mar. 5, 2014. However, Berlinches and Tejera provides a collapsible simulator chair that fails to allow the player to adjust the game controller distance and the pedal height adjustment, for better reach the steering wheel and more realistic driver's feet position inside of an open wheel simulation.

Thus, it remains a requirement in the state of art to provide a portable folding video game chair that is shipped assembled, but still sold in a compact packaging, allowing the player, with a leg movement over the seat, be ready to seat and play. Then, collapse it to be stealthily concealed in very narrow spaces of a small room, like behind or under a sofa or a bed. Finally, have adjustments like depth, height and inclination on the steering wheel for, any size player, better comfort, and pedal controller height adjustment for simulation of different racing car games styles.

BRIEF SUMMARY OF THE INVENTION

A portable folding video game chair is provided. The chair is configured to collapse into a storage configuration for storage in very narrow spaces of a small room, like behind or under a sofa or a bed. Additionally, the chair is configured to provide a user with adjustments that may include depth, height, and inclination for a steering wheel controller that is coupled to the chair which enables the chair to accommodate any size user or video game player for better comfort, and adjustment for pedal controller height for simulation of different racing car games styles, such as open wheel configuration and closed wheel configuration, as well as flight simulation and other simulation of other vehicle driving positions.

In some embodiments, the chair may include a backrest frame, a seating frame, a collapsible sling chair, a steering wheel controller column, a steering wheel controller shaft, a quick release steering wheel controller support, a pedal controller frame, and a quick release pedals controller support. The backrest frame may have a first front leg, a second front leg, a rear top crossbar, and a front bottom crossbar. The rear top crossbar may couple an upper portion of the first front leg to an upper portion of the second front leg, and the front bottom crossbar may couple a lower portion of the first front leg to a lower portion of the second front leg so that the first front leg and second front leg are substantially parallel to each other. The seating frame may have a first rear leg, a second rear leg, a front top crossbar, and a rear bottom crossbar. The front top crossbar may couple an upper portion of the first rear leg to an upper portion of the second rear leg, and the rear bottom crossbar may couple a lower portion of the first rear leg to a lower portion of the second rear leg so that the first rear leg and second rear leg are parallel to each other. The first rear leg may be pivotally coupled to the first front leg and the second rear leg may be pivotally coupled to the second front leg. The collapsible sling chair may be coupled to the front top crossbar and to the rear top crossbar. The steering wheel controller column, having a pole, may be coupled to the front bottom crossbar. The steering wheel controller shaft may have a steering wheel vertical adjuster shaft that may be movably coupled to the pole of the steering wheel controller column. The pedal controller frame may have a first pedal controller rail, a second pedal controller rail, and a pedal controller frame crossbar. The pedal controller frame crossbar may couple an upper portion of the first pedal controller rail to an upper portion of the second pedal controller rail, a lower portion of the first pedal controller rail may be coupled to the front bottom crossbar, and a lower portion of the second pedal controller rail may be coupled to the front bottom crossbar. The quick release pedals controller support may have a pedals controller support aperture, and the quick release pedals controller support is movably coupled to pedal controller frame by inserting the first pedal controller rail and second pedal controller rail through the pedals controller support aperture.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
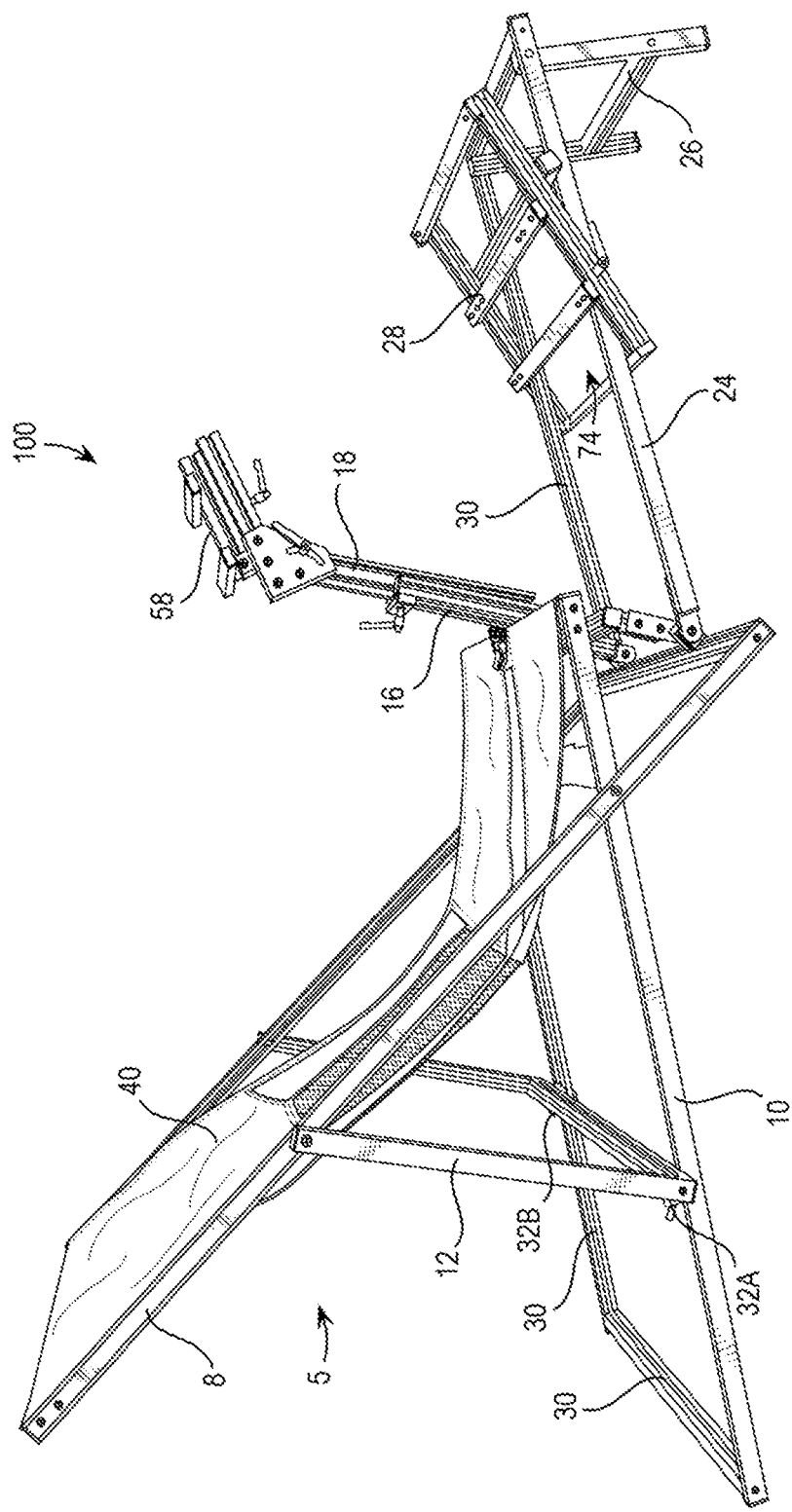
FIG. 1 depicts a perspective view of an example of a portable folding video game chair in an open wheel configuration according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new portable folding video game chair is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1, 2, 3, 6, 7, 16, and 17 illustrate examples of a portable folding video game chair ("the chair") 100 according to various embodiments. In preferred embodiments, the chair 100, is able to collapse very compactly into a storage configuration 3 (FIG. 6) suitable for facilitating shipment and storage. The chair 100 may be moved out of the storage configuration 3 and into one or more other configurations, such as an open wheel configuration 5 and a closed wheel configuration 7, which may allow the chair 100 to support the body of a user 205 and preferably one or more games controller devices known in the art, such as a steering wheel controller 201, a pedal controller 202, a lever controller 203, etc. The open wheel configuration 5 and closed wheel configuration 7 allow the chair 100 to provide the user 205 with selectable driver positions for different video games that incorporate one or more games controller devices 201, 202, 203. Game controller devices 201, 202, 203, are designed to work with video game platform including, but not limited to: Electronic video game consoles, and personal computers. The game controller devices 201, 202, 203, are designed to work also with video game software including but not limited to: Open wheel car racing video game simulators, close wheel car racing video game simulators, and video game flight simulators. This makes the chair 100 suitable for use as a seat for car racing simulation as well for airplane fighting simulation and any other vehicle type simulation. The chair 100 described herein may be used to enhance the experience of any of the car racing and flight simulator video game software.

In some embodiments, the chair 100 may comprise a backrest frame 8, a seating frame 10, a collapsible sling chair 40, a steering wheel controller column 16, a steering wheel controller shaft 18, a quick release steering wheel controller support 58, a pedal controller frame 24, and a quick release pedals controller support 28. The backrest frame 8 may have a first front leg 15, a second front leg 17, a rear top crossbar 11, and a front bottom crossbar 13. The rear top crossbar 11 may couple an upper portion of the first front leg 15 to an upper portion of the second front leg 17, and the front bottom crossbar 13 may couple a lower portion of the first front leg 15 to a lower portion of the second front leg 17 so that the first front leg 15 and second front leg 17 are substantially parallel to each other. The seating frame 10 may have a first rear leg 23, a second rear leg 25, a front top crossbar 19, and a rear bottom crossbar 21. The front top crossbar 19 may couple an upper portion of the first rear leg 23 to an upper portion of the second rear leg 25, and the rear bottom crossbar 21 may couple a lower portion of the first rear leg 23 to a lower portion of the second rear leg 25 so that the first rear leg 23 and second rear leg 25 are parallel to each other. The first rear leg 23 may be pivotally coupled to the first front leg 15 and the second rear leg 25 may be pivotally coupled to the second front leg 17. The collapsible sling chair 40 may be coupled to the front top crossbar 19 and to the rear top crossbar 11. The steering wheel controller column 16, having a pole 47, may be coupled to the front bottom crossbar 13. The steering wheel controller shaft 18 may have a steering wheel vertical adjuster shaft 55 that may be movably coupled to the pole 47 of the steering wheel controller column 16. A quick release steering wheel controller support 58 having a quick release steering wheel controller horizontal adjuster 59 may be movably coupled to the steering wheel controller shaft 18. The pedal controller frame 24 may have a first pedal controller rail 63, a second pedal controller rail 67, and a pedal controller frame crossbar 71. The pedal controller frame crossbar 71 may couple an upper portion of the first pedal controller rail 63 to an upper portion of the second pedal controller rail 67, a lower portion of the first pedal controller rail 63 may be coupled to the front bottom crossbar 13, and a lower portion of the second pedal controller rail 67 may be coupled to the front bottom crossbar 13. The quick release pedals controller support 28 may have a pedals controller support aperture 74, and the quick release pedals controller support 28 is movably coupled to pedal controller frame 24 by inserting the first pedal controller rail 63 and second pedal controller rail 67 through the pedals controller support aperture 74.

In preferred embodiments, the chair 100 may comprise a collapsible sling chair 40 which may be coupled to a backrest frame 8 and also to a seating frame 10. The backrest frame 8 and seating frame 10 may be pivotally coupled to each other so that the chair 100 may be moved between a storage configuration 3, an open wheel configuration 5, and a closed wheel configuration 7. The collapsible sling chair 40 may comprise a flexible material which may enable the shape of the collapsible sling chair 40 to change as the backrest frame 8 and seating frame 10 are moved relative to each other between the configurations 3, 5, 7.

In some embodiments, the backrest frame 8 may comprise one or more structural elements which may include: at least one rear top crossbar 11, at least one front bottom crossbar 13, a first front leg 15, and second front leg 17, preferably forming a rectangular or trapezoidal shaped backrest frame 8. In preferred embodiments, the at least one rear top crossbar 11 may be substantially parallel to the at least one front bottom crossbar 13, and/or the first 15 and second 17 front legs may preferably be substantially parallel or optionally in angle in relation to each other. One or more of the elements 11, 13, 15, 17, of the backrest frame 8 may be made from or may comprise any substantially rigid material that may include various types of metal, such as, for example, aluminum, wood, carbon fiber, plastics or any other suitable materials known to those skilled in the art or a combination of those known materials. One or more of the rear top crossbar 11, the front bottom crossbar 13, the first front leg 15, and the second front leg 17, may be coupled together with any suitable coupling method, such as welding, adhesives, bonding, screwing, fastening, bending, being integrally formed or molded together, etc.

The seating frame 10 may comprise one or more structural elements which may include: at least one front top crossbar 19, at least one rear bottom crossbar 21, a first rear leg 23, and second rear leg 25, preferably forming a rectangular or trapezoidal shaped frame. In preferred embodiments, the at least one front top crossbar 19 may be substantially parallel to the at least one rear bottom crossbar 21, and/or the first and second rear legs 23 and 25 may preferably be substantially parallel or optionally in angle in relation to each other. One or more of the elements 19, 21, 23, 25, of the seating frame 10 may be made from or may comprise any substantially rigid material that may include various types of metal, such as, for example, aluminum, wood, carbon fiber, plastics or any other suitable materials known to those skilled in the art or a combination of those known materials. In some embodiments the front top crossbar 19, the rear bottom crossbar 21, the first rear leg 23, and the second rear leg 25, may be coupled together with any suitable coupling method, such as welding, adhesives, bonding, screwing, fastening, bending, being integrally formed or molded together, etc.

In preferred embodiments, the backrest frame 8 and the seating frame 10 may be pivotally coupled together. In further preferred embodiments, the first rear leg 23 may be pivotally coupled to the first front leg 15 via a first hinge 27 and the second rear leg 25 may be pivotally coupled to the second front leg 17 via a second hinge 29. When the chair 100 is not in the storage configuration 3, such as by being in an open wheel configuration 5 or closed wheel configuration 7, the hinges 27 and 29 may enable the backrest frame 8 and the seating frame 10 to generally form a crisscrossed structure. Hinges 27 and 29 may comprise any pivotal coupling method, such as nut and bolt type fasteners, rivets, etc.

The chair 100 may comprise a pitch selector 12 which may be configured to govern the positioning of the backrest frame 8 and the seating frame 10 relative to each other so that the chair 100 may support a user 205. In some embodiments, a pitch selector 12 may be pivotally connected to the backrest frame 8. In preferred embodiments, a pitch selector 12 may comprise a first strut 31, a second strut 33, and a position selector crossbar 35. Preferably, the first strut 31 and second strut 33 may be substantially parallel or optionally angled in relation to each other, and the position selector crossbar 35 may couple the first strut 31 and second strut 33 together forming a generally "U" shaped frame. The pitch selector 12 may be pivotally coupled to the backrest frame 8 through a hinge 37 located in the end of the strut 31 and also coupled to the first front leg 15, and through a hinge 39 located in the end of the strut 33 and also coupled to the second front leg 17. Preferably, the pitch selector 12 may be coupled to the first front leg 15 and the second front leg 17, and the pitch selector 12 may be configured to rest on the first rear leg 23 and the second rear leg 25 to support the rear top crossbar 11 a desired distance from the rear bottom crossbar 21.

One or more of the elements 31, 33, 35, of the pitch selector 12 may be made from or may comprise any substantially rigid material that may include various types of metal, such as, for example, aluminum, wood, carbon fiber, plastics or any other suitable materials known to those skilled in the art or a combination of those known materials. In some embodiments the first strut 31, second strut 33, and position selector crossbar 35, may be coupled together with any suitable coupling method, such as welding, adhesives, bonding, screwing, fastening, bending, being integrally formed or molded together, etc.

In some embodiments, and as shown in FIGS. 1, 2, 4, and 15, the chair 100 may comprise one or more retainers, such as a first retainer 32A and a second retainer 32B, which may be configured to arrest the position of the pitch selector 12 at a desired location along the rear legs 23, 25, of the seating frame 10. Preferably, a retainer 32A, 32B, may comprise a block or other shaped unit of material which may be movably coupled to desired locations on the rear legs 23, 25, of the seating frame 10 via quick release fastener. For example, the rear legs 23, 25, may each comprise a channel 30 that may extend along each rear leg 23, 25, and a first retainer 32A may be coupled to the channel 30 of the first rear leg 23 and a second retainer 32B may be coupled to the channel 30 of the second rear leg 25. Each retainer 32A, 32B, may be coupled to its rear leg 23, 25, via a quick release fastener 61D, 61E, which may comprise a cam lever that may be inserted into a channel 30, and by pivoting the cam lever in a first direction, the cam may clamp or lock the retainer 32A, 32B, to the rear leg 23, 25, while pivoting the cam lever in a second direction, the cam may release the retainer 32A, 32B, so that it may be moved to a desired position on the rear leg 23, 25. By locking or positioning the retainers 32A, 32B, via their respective quick release fastener 61D, 61E, relatively closer to the rear bottom crossbar 21 and resting the position selector crossbar 35 against the retainers 32A, 32B, the chair 100 may be maintained in the open wheel configuration 5, while locking or positioning the retainers 32A, 32B, via their respective quick release fastener 61D, 61E, relatively farther from the rear bottom crossbar 21 and resting the position selector crossbar 35 against the retainers 32A, 32B, the chair 100 may be maintained in the closed wheel configuration 7.

In some embodiments, the pitch selector 12 may comprise a position selector crossbar 35 that may be sized to rest against one or more retainers 32A, 32B, that are able to be coupled to two or more different locations or regions 4B, 4C, 4D, 4E, on the rear legs 23, 25, of the seating frame 10. When the pitch selector 12 is positioned to rest against retainers 32A, 32B, that are located in region 4C the chair 100 is set up in the open wheel configuration 5 to simulate an open wheel driver position and accommodate a shorter video game driver/user 205. When the pitch selector 12 is positioned to rest against retainers 32A, 32B, that are located in region 4B the portable folding video game chair 2 is set up in the open wheel driver position and accommodate a taller video game driver/user 205. When the pitch selector 12 is positioned to rest against retainers 32A, 32B, that are located in region 4D the portable folding video game chair 2 is set up in the closed wheel configuration 7 to simulate a close wheel driver position and accommodate a taller video game driver/user 205. When the pitch selector 12 is positioned to rest against retainers 32A, 32B, that are located in region 4E the portable folding video game chair 2 is set up in the closed wheel configuration 7 to simulate a close wheel driver position and accommodate a shorter video game driver/user 205.

Figure 14:
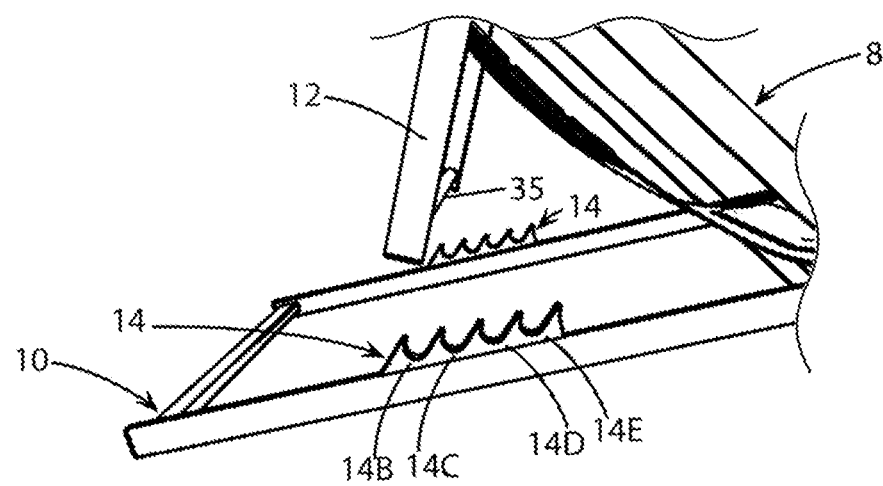
FIG. 14 depicts a partial perspective view illustrating some example components of a portable folding video game chair which may be used to position a pitch selector according to various embodiments described herein.
Figure 15:
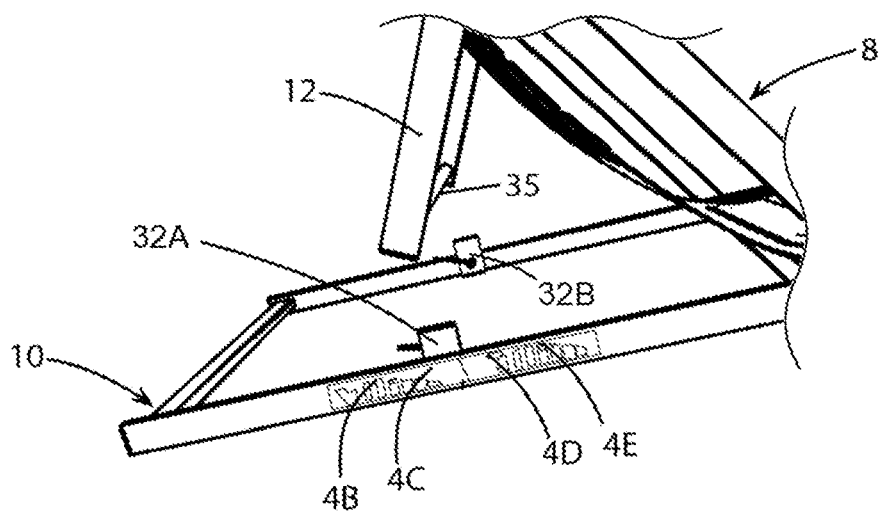
FIG. 15 shows a partial perspective view illustrating some alternative example components of a portable folding video game chair which may be used to position a pitch selector according to various embodiments described herein.

In some embodiments, and as shown in FIG. 14, the chair 100 may comprise one or more slot assemblies 14 which may be coupled to one or more rear legs 23, 25, of the seating frame 10 and/or backrest frame 8 with each slot assembly 14 having one or more slots 14A, 14B, 14C, 14D, 14E, etc. Generally, a slot 14A, 14B, 14C, 14D, 14E, may be sized and shaped to receive a portion of the pitch selector 12, such as a portion of the position selector crossbar 35, lower portion of a strut 31, 33, etc., so that once that portion of the pitch selector 12 is positioned in a slot 14A, 14B, 14C, 14D, 14E, of one and more preferably two slot assemblies 14, the pitch selector 12 may be arrested in position to maintain the rear top crossbar 11 a desired distance from the rear bottom crossbar 21.

In some embodiments, the pitch selector 12 may comprise a position selector crossbar 35 that may be sized to fit into, at least one, slot 14B, 14C, 14D, 14E, of a slot assembly 14 that may be coupled to the first rear leg 23 and also into, at least one, slot 14B, 14C, 14D, 14E, of a slot assembly 14 that may be coupled to the second rear leg 25. In some embodiments, a slot assembly 14 may be embedded in, or otherwise coupled to at least one structure connected to the mid region of the rear bottom crossbar 21. When the pitch selector 12 is positioned in slot, 14C the chair 100 is set up in the open wheel configuration 5 to simulate an open wheel driver position and accommodate a shorter video game driver/user 205. When the pitch selector 12 is positioned in slot 14B the portable folding video game chair 2 is set up in the open wheel configuration 5 to simulate an open wheel driver position and accommodate a taller video game driver/user 205. When the pitch selector 12 is positioned in slot 14D the portable folding video game chair 2 is set up in the closed wheel configuration 7 to simulate a close wheel driver position and accommodate a taller video game driver/user 205. When the pitch selector 12 is positioned in slot 14E the portable folding video game chair 2 is set up in the closed wheel configuration 7 to simulate a close wheel driver position and accommodate a shorter video game driver/user 205.

The chair 100 may comprise a collapsible sling chair 40 which may be coupled to and supported by, at least one, rear top crossbar 11 and, at least one, front top crossbar 19, in order to form a seat for user 205. In preferred embodiments, the collapsible sling chair 40 may be made from or may comprise a flexible material which may allow the collapsible sling chair 40 to be bend and folded when the chair 100 is in the storage configuration 3 and also unfolded or expanded such as when the chair 100 is in or between the open wheel configuration 5 and closed wheel configuration 7. In some embodiments, the flexible material that the collapsible sling chair 40 may be made from or may comprise may include various types of flexible plastics such as polyvinyl chloride, natural or synthetic rubber, synthetic fabrics such as nylon, polyester, acrylic, nylon, rayon, acetate, spandex, spandex blends, and Kevlar, and natural fabrics such as coir, cotton, hemp, jute, canvas, flax, leather, linen, ramie, wool, silk, or any other suitable flexible natural or synthetic material including combinations of materials.

Figure 16:
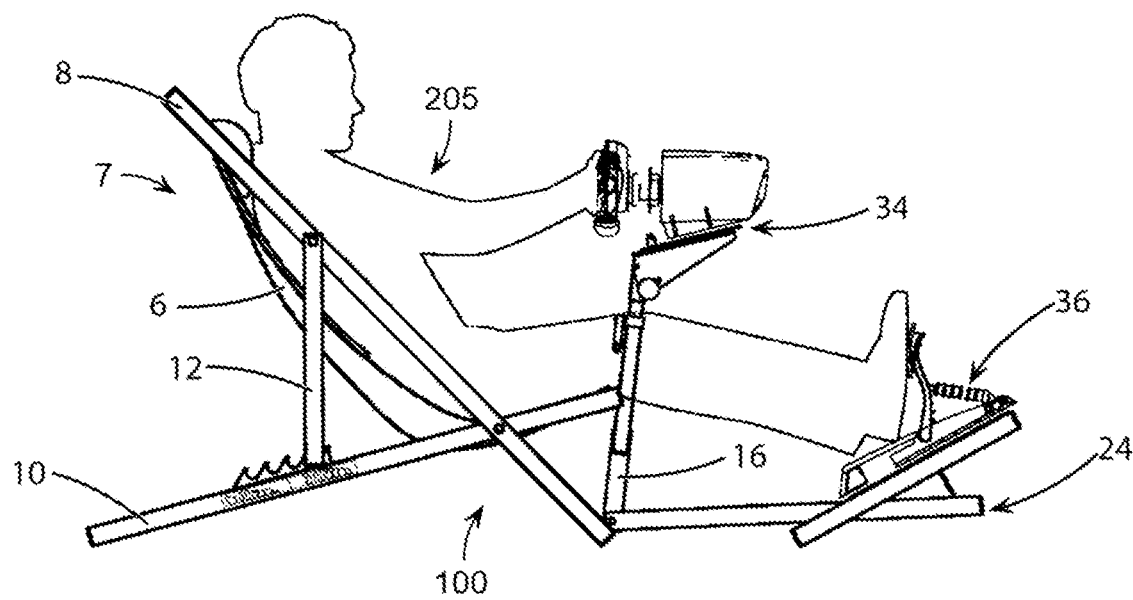
FIG. 16 depicts a perspective view of an example of a portable folding video game chair supporting a user in a closed wheel configuration according to various embodiments described herein.
Figure 17:
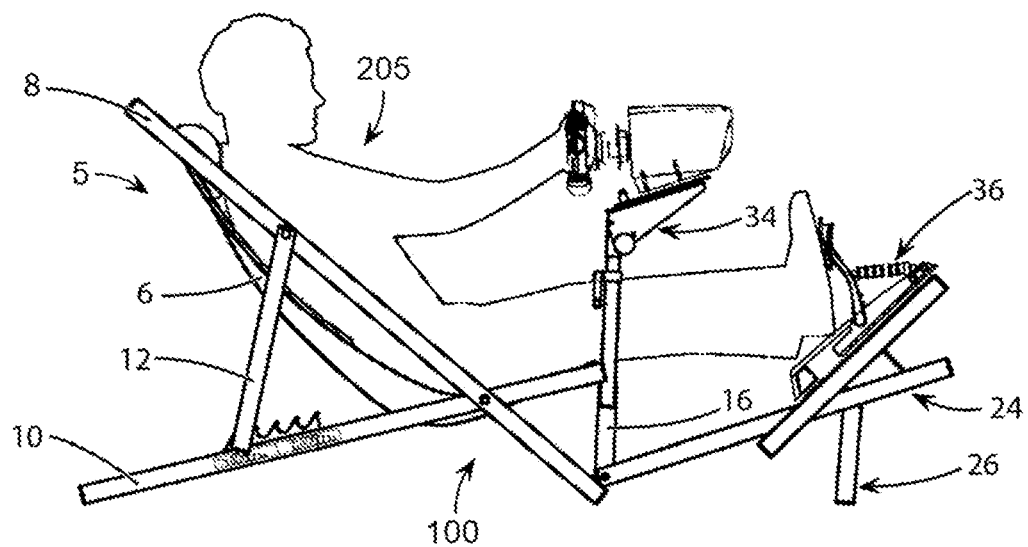
FIG. 17 illustrates a perspective view of an example of a portable folding video game chair supporting a user in an open wheel configuration according to various embodiments described herein.

In some embodiments, a collapsible sling chair 40 may include two or more sections of flexible materials. For example, a first portion of non-stretchable back fabric 41, a portion of stretchable fabric 43, and a second portion of non-stretchable seat fabric 45. The different kinds of fabrics are designed to give to the video gamer comfort and simulates the thigh fitting of real racing car seats. The stretchable fabric 43 may be made from textiles as, for example, two way stretch mesh that stretch along to the cross-section of the seat or any other suitable materials known to those skilled in the art. The non-stretchable back fabric 41 and the non-stretchable seat fabric 45 may be made from textiles as, for example, Nylon fabric with soft padding or any other suitable materials know to those skilled in the art or a combination of those known materials. As depicted in FIGS. 16 and 17, the flexibility of the collapsible sling chair 40 allows the user 205, as his/her wish, to be seated towards the front of the seat or towards the back of the seat, adjusting the body pitch for best comfort of the user 205 or video gamer.

In some embodiments, the chair 100 may comprise a back support 98 which may be used to provide extra and/or adjustable or user 205 selectable back support. In some embodiments, a back support 98 may comprise a length of flexible material that may be coupled to the first front leg 15 and second front leg 17 and which may further support the back of a user 205 resting in the collapsible sling chair 40. In preferred embodiments, a back support 98 may be movably coupled to the first front leg 15 and second front leg 17 so that the back support 98 may be moved towards and away from the crossbars 11, 13, of the backrest frame 8. For example, by moving or sliding the back support 98 towards the rear top crossbar 11 the back support 98 may provide extra support to upper portions of the user's back and by moving or sliding the back support 98 towards the front bottom crossbar 13 the back support 98 may provide extra support to lower portions of the user's back.

The chair 100 may comprise a steering wheel controller column 16 and a steering wheel controller shaft 18 which may be configured to support a steering wheel controller 201 in a desired position from a user 205 that is seated in the collapsible sling chair 40. In some embodiments, a steering wheel controller column 16 may comprise at least one pole 47 that may be coupled to one or more prongs, such as a first prong 47A and a second prong 47B. In preferred embodiments, the steering wheel controller column 16 may be pivotally coupled to the front bottom crossbar 13 and/or pivotally coupled to the pedal controller frame 24. In preferred embodiments, the pole 47 may include two prongs 47A and 47B, forming a fork shape, each having a hinge 49A, 49B, and the hinges 49A, 49B, may be pivotally connected to rail hinges 65, 69, embedded in the mid region of the front bottom crossbar 13 enabling the pole 47 to pivot towards and away from the collapsible sling chair 40. The steering wheel controller column 16 may be any substantially rigid material that may include various types of metal, such as, for example, aluminum, wood, carbon fiber, plastics or any other suitable materials known to those skilled in the art or a combination of those known materials.

Figure 8:
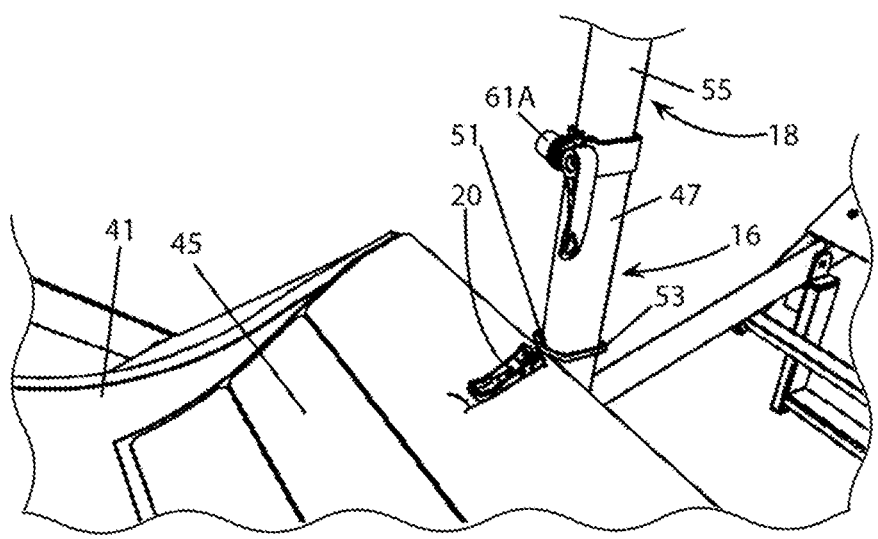
FIG. 8 illustrates a partial perspective view of an example of a steering wheel controller shaft according to various embodiments described herein.
Figure 9:
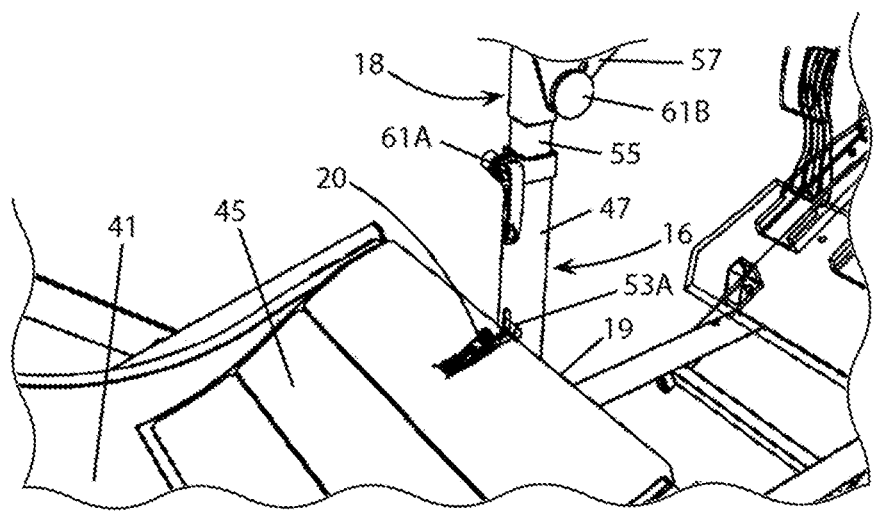
FIG. 9 shows a partial perspective view of another example of a steering wheel controller shaft according to various embodiments described herein.

Preferably, the pole 47 may be removably coupled to the front top crossbar 19 of the seating frame 10 to stop the ability of the pole 47 to pivot towards and away from the collapsible sling chair 40. In preferred embodiments, the pole 47 may be removably coupled or non-permanently mechanically fastened by, at least one, latch 20 embedded in the mid region of the front top crossbar 19, so that the latch 20 removably couples the pole 47 of the steering wheel controller column 16 to the front top crossbar 19. Generally, a latch 20 may comprise any type of removable fastener, such as a quick release fastener, which may be used to provide a sturdy and locked upright position of the pole 47, by tightly connecting or coupling the pole 47 to the seating frame 10. In some embodiments, and as shown in FIG. 9, the latch 20 may comprise a key 53A that passes into the pole 47 grasping tightly the pole 47 against the seating frame 10. In some embodiments, and as shown in FIG. 8, the latch 20 may comprise a hook 51 that grasps a hoop 53 that surrounds the pole 47. In some embodiments the pole 47, and the pole hinge 49, may be hinged connected by a fastener like screw, rivet, threaded rod, spindle, living hinge or the like. The hinge 49 may be permanently fixed or clip on the front bottom crossbar 13.

In preferred embodiments, the chair 100 may comprise a steering wheel controller shaft 18 which may be telescopically or otherwise movably coupled to the steering wheel controller column 16. The steering wheel controller shaft 18 may also comprise a quick release steering wheel controller support 58 having a quick release steering wheel controller horizontal adjuster 59 that may be coupled to the steering wheel controller shaft 18, preferably via a a steering wheel horizontal adjuster shaft 56 and a steering wheel angle adjuster 57. The quick release steering wheel controller support 58 may be used to removably couple and/or movably couple a steering wheel controller 201 to the steering wheel controller shaft 18. Optionally, a quick release steering wheel horizontal adjuster 59 may comprise one or more adjuster crossbars 59A, 59B, which may contact and support a steering wheel controller 201 and which may optionally for one or more pedal support surfaces 73. Generally, a quick release steering wheel controller support 58 may be configured as a bracket preferably having a quick release steering wheel horizontal adjuster 59, a first adjuster crossbar 59A, and/or a second adjuster crossbar 59B of which one or more may include mounting apertures, fasteners, or other devices or methods of coupling a steering wheel controller 201.

Figure 10:
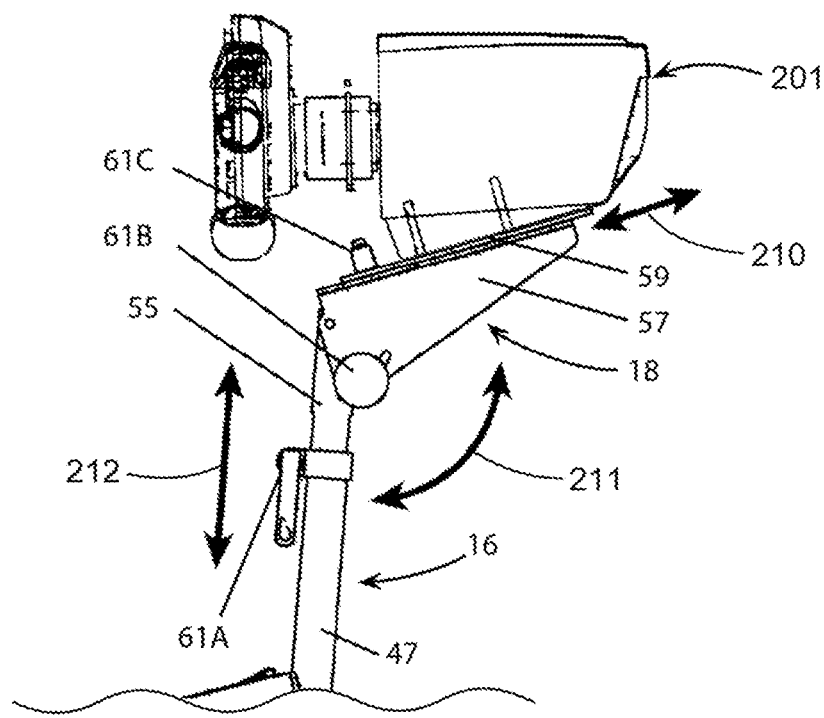
FIG. 10 depicts a partial perspective view illustrating some example positioning adjustments of an exemplary steering wheel controller shaft according to various embodiments described herein.

In some embodiments, the steering wheel controller shaft 18 may be movably coupled to the pole 47 via a quick release fastener 61A. For example, the steering wheel controller shaft 18 may comprise a steering wheel vertical adjuster shaft 55 which may be telescopically or otherwise movably coupled to the pole 47 of the steering wheel controller column 16 via a quick release fastener allowing a steering wheel controller 201 that is coupled to the steering wheel controller shaft 18 to have height adjustment as shown by arrows 212 in FIG. 10. In preferred embodiments, the steering wheel controller shaft 18 may be movably and removably coupled to steering wheel controller column 16 via a quick release fastener 61A. Preferably, the steering wheel vertical adjuster shaft 55 moves parallel to the steering wheel controller column 16 stopping in the desirable height distance by means of, at least one, non-permanent mechanical or quick release fastener 61A.

In some embodiments, the steering wheel controller shaft 18 may include a steering wheel angle adjuster 57 which may pivotally couple the steering wheel vertical adjuster shaft 55 to a steering wheel horizontal adjuster shaft 56, and the steering wheel horizontal adjuster shaft 56 may be coupled to the quick release steering wheel horizontal adjuster 59, allowing for a steering wheel controller 201 that is coupled to the quick release steering wheel horizontal adjuster 59 to have angle adjustment around an axis provided by a quick release fastener 61B or other type of pivotal coupling. In this manner, a steering wheel angle adjuster 57 may allow a steering wheel controller 201 that is coupled to the steering wheel controller shaft 18 to pivot relative to the steering wheel vertical adjuster shaft 55 as shown by arrows 211 in FIG. 10. Preferably, the steering wheel angle adjuster 57 may pivotally connected to the steering wheel vertical adjuster shaft 55 stopping in the desirable angle between the steering wheel controller 201 and the video gamer position by means of, at least one, non-permanent mechanical or quick release fastener 61B distanced of the system center of rotation allowing fixing a desirable angle.

In some embodiments, the steering wheel controller shaft 18 may include a quick release steering wheel horizontal adjuster 59 that is movably coupled to the steering wheel angle adjuster 57, optionally via a steering wheel horizontal adjuster shaft 56, allowing steering wheel controller 201 to have depth adjustment (shown with arrows 210 in FIG. 10) so that the quick release steering wheel horizontal adjuster 59 and a steering wheel controller 201 that is coupled to it to be moved towards and away from the collapsible sling chair 40. Preferably, the quick release steering wheel horizontal adjuster 59 may be movingly coupled, such as by being sliding connected, to a steering wheel horizontal adjuster shaft 56 which in turn may be coupled to the steering wheel angle adjuster 57 stopping in the desirable depth distance between the steering wheel controller 201 and the video gamer position by means of, at least one, non-permanent mechanical or quick release fastener 61C. All these adjustments enable the user 205 to position the steering wheel controller 201 in a desired comfortable position. In some embodiments, the steering wheel controller 201 may be securely coupled to the steering wheel controller shaft 18, more particularly securely coupled to the quick release steering wheel horizontal adjuster 59, by fasteners, such as one or more quick release fasteners, which may allow the quick release steering wheel horizontal adjuster 59 to be easily removed and attached to the steering wheel controller shaft 18. The steering wheel controller shaft 18 may be any substantially rigid material that may include various types of metal, such as, for example, aluminum, wood, carbon fiber, plastics or any other suitable materials known to those skilled in the art or a combination of those known materials.

In some embodiments, the chair 100 may comprise a pedal controller frame 24 which may be configured to be coupled to a pedal controller 202. In preferred embodiments, the pedal controller frame 24 may be pivotally coupled to the backrest frame 8, such as to the front bottom crossbar 13, and/or to the steering wheel controller column 16. In some embodiments, the pedal controller frame 24 may include a first pedal controller rail 63, pivotally connected to the steering wheel controller column 16 and/or to the backrest frame 8 through the first rail hinge 65, a second pedal controller rail 67, pivotally connected to the steering wheel controller column 16 and/or to the backrest frame 8 through the second rail hinge 69, and, at least one, pedal controller frame crossbar 71 connected to the first pedal controller rail 63 and second pedal controller rail 67, preferably forming a "U" shaped frame. The pedal controller frame 24 may be any substantially rigid material that may include various types of metal, such as, for example, aluminum, wood, carbon fiber, plastics or any other suitable materials known to those skilled in the art or a combination of those known materials. In some embodiments, the first pedal controller rail 63, the second pedal controller rail 67, the first rail hinge 65, the second rail hinge 69, and the pedal controller frame crossbar 71, may be assembled using welding, adhesives, bonding, screwing, fastening, bending, or any other suitable coupling method. In some embodiments, the first rail hinge 65 and the second rail hinge 69 may be permanently fixed or coupled on the steering wheel controller column 16. In some embodiments, the first rail hinge 65 and the second rail hinge 69 may be permanently fixed or coupled on the front bottom crossbar 13.

Figure 11:
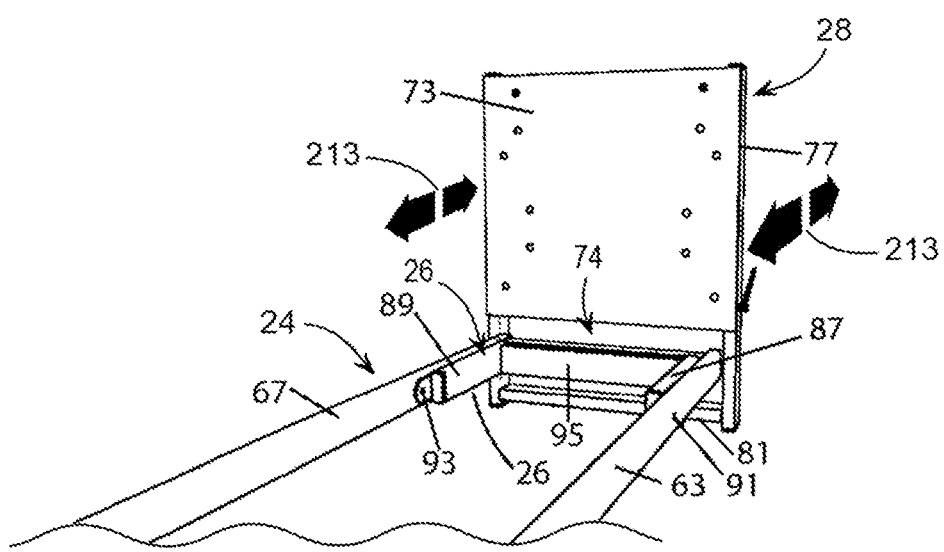
FIG. 11 illustrates a partial perspective view illustrating some example positioning adjustments of an exemplary quick release pedals controller support according to various embodiments described herein.
Figure 12:
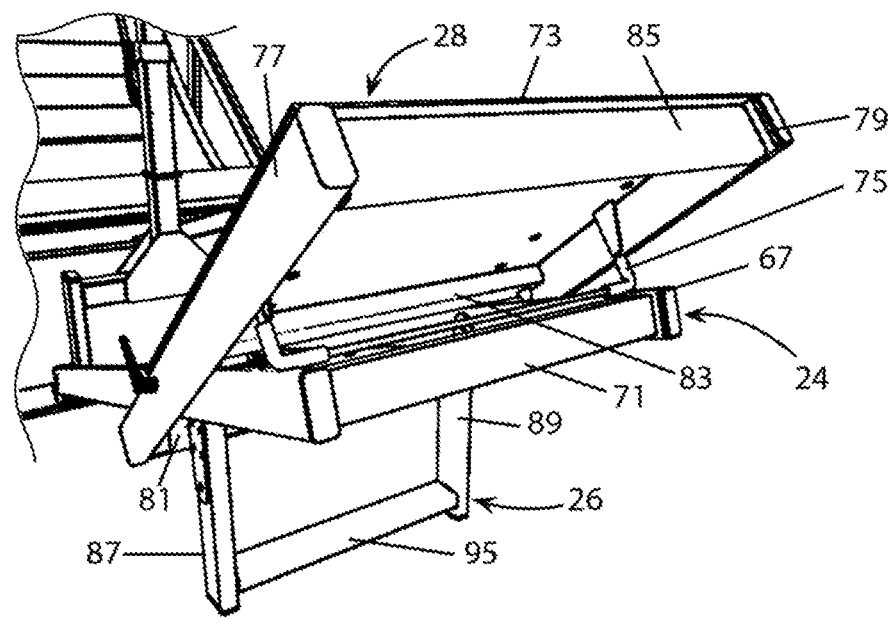
FIG. 12 shows a partial perspective view illustrating some example components of a portable folding video game chair which may be used to position a quick release pedals controller support according to various embodiments described herein.

In some embodiments, the chair 100 may comprise a quick release pedals controller support 28 which may be sliding connected to the pedal controller frame 24 by inserting a portion of the pedal controller frame 24 through a pedals controller support aperture 74 of the quick release pedals controller support 28. In some embodiments, a quick release pedals controller support 28 may comprise a first rail leg 77, a second rail leg 79, a foot crossbar 81, and a mid crossbar 83, in which the foot crossbar 81 couples a lower portion of the first rail leg 77 to a lower portion of the second rail leg 79, the mid crossbar 83 couples an upper portion of the first rail leg 77 to an upper portion of the second rail leg 79, and the pedals controller support aperture 74 is bounded by the first rail leg 77, second rail leg 79, foot crossbar 81, and mid crossbar 83. By inserting the pedal controller rails 63, 67, through the pedals controller support aperture 74, the quick release pedals controller support 28 may be moved towards and away (shown by arrows 213 in FIG. 11) from the user 205 in the collapsible sling chair 40.

In further embodiments, a quick release pedals controller support 28 may comprise a pedal support surface 73, a pivoting connected pedal controller support bracket 75, a first rail leg 77, a second rail leg 79, a foot crossbar 81, mid crossbar 83 and a head crossbar 85. The first rail leg 77 cooperatively slides along the first pedal controller rail 63, and a second rail leg 79 cooperatively slides along the second pedal controller rail 67. When the pedal controller support bracket 75 is pivotally moved out it will arrest the pedal controller support 28 with mechanical help of the foot crossbar 81, mid crossbar 83, in which the arresting happens when the quick release pedals controller support 28 is rotated and laid over the pedal controller frame 24 creating three points of touch between the quick release pedals controller support 28 and the first pedal controller rail 63 and three points of touch between the quick release pedals controller support 28 and the second pedal controller rail 67. With this frictional arresting, the quick release pedals controller support 28 may be positioned a desired distance from the collapsible sling chair 40 so that a pedal controller 202 that is coupled to the quick release pedals controller support 28 may be appropriately adjusted for the length for the video gamer legs. The pedal controller 202 may be securely coupled to the pedal support surface 73 by fasteners or any suitable coupling method. Preferably, when the pedal controller 202 is actuated/pressed the quick release pedals controller support 28 keeps its position without sliding via friction although one or more fasteners or any coupling method may be used.

Figure 13:
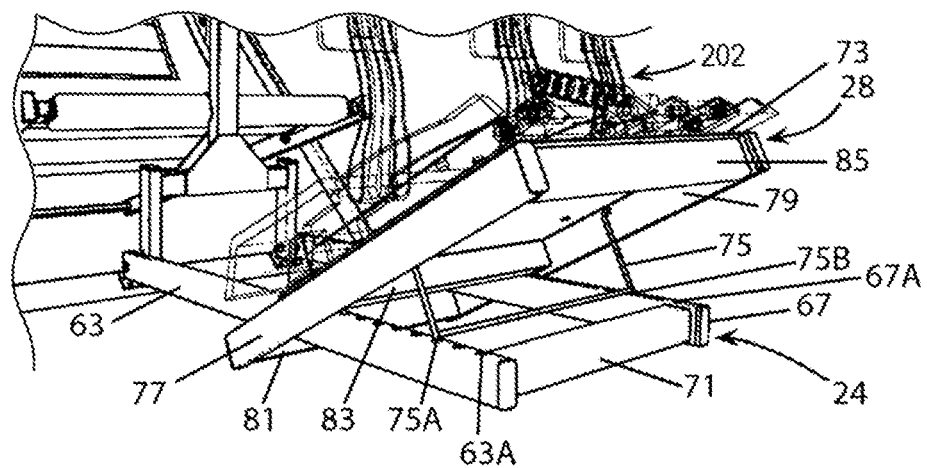
FIG. 13 illustrates a partial perspective view show some example components of a portable folding video game chair which may be used to position a quick release pedals controller support according to various embodiments described herein.

In some embodiments, when the user 205 or video gamer rotates back the quick release pedals controller support 28 for a more perpendicular position against the pedal controller frame 24, this also allows the controller support 28 to be relocated to a different position along the pedal controller rails 63, 67, to accommodate user's having different leg length. In some embodiments, and as shown in FIG. 13, the controller support bracket 75 can have bracket prongs 75A and 75B on its ends that fit in corresponding first indentations 63A on the first pedal controller rail 63 and second indentations 67A on the second pedal controller rail 67, helping to arrest the sliding movement of the pedal controller support 28 over the pedal controller frame 24. The quick release pedals controller support 28 may be made from a metal as, for example, aluminum. The quick release pedals controller support 28 may be any substantially rigid material that may include various types of metal, such as, for example, aluminum, wood, carbon fiber, plastics or any other suitable materials known to those skilled in the art or a combination of those known materials. Optionally, the controller support bracket 75 may be permanently fixed or coupled on the pedal controller support 28. In some embodiments the controller support bracket 75, may be assembled fixed using welding, adhesives, bonding, screwing, fastening, bending, or any other coupling method.

In some embodiments, the pedal controller frame 24 may comprise pedal elevator 26 that preferably may be pivotally coupled to pedal controller frame 24. In some embodiments, a pedal elevator 26 may comprise: a first leg elevator 87 that may be pivotally connected to the first pedal controller rail 63 through a first elevator hinge 91; a second leg elevator 89 that may be pivotally connected to the second pedal controller rail 67 through a second elevator hinge 93; and preferably, at least one, elevator crossbar 95, connected to the first leg elevator 87 and to the second leg elevator 89 preferably forming a "U" shaped frame pedal elevator 26. In a preferred embodiment the first elevator hinge 91 and the second elevator hinge 93 may comprise a rotation restrictor 97 that, when the pedal elevator 26 is actuated so as to be pivoted or folded down towards the floor, it hits the first pedal controller rail 63 and the second pedal controller rail 67 ensuring a sturdy higher position of the pedal controller frame 24. The pedal elevator 26 may be made from or may comprise any substantially rigid material that may include various types of metal, such as, for example, aluminum, wood, carbon fiber, plastics or any other suitable materials known to those skilled in the art or a combination of those known materials. In some embodiments the first leg elevator 87, the first elevator hinge 91, the second leg elevator 89, the second elevator hinge 93, and the elevator crossbar 95, may be assembled using welding, adhesives, bonding, screwing, fastening, bending, or any other suitable coupling method. Optionally, the first elevator hinge 91 and the second elevator hinge 93 may be permanently fixed or clipped on the pedal controller frame 24.

Figure 2:
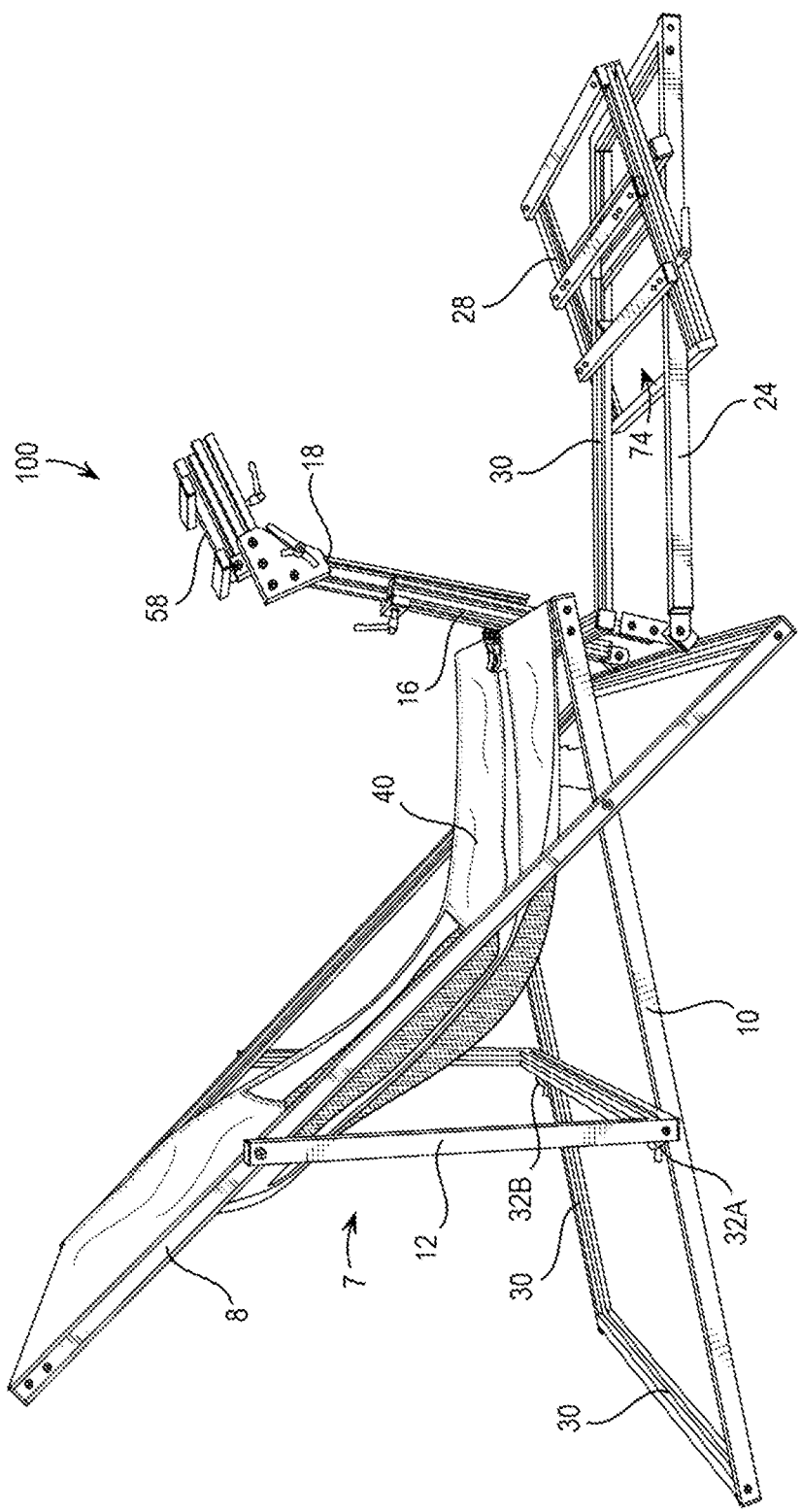
FIG. 2 illustrates a perspective view of an example of a portable folding video game chair in a closed wheel configuration according to various embodiments described herein.
Figure 3:
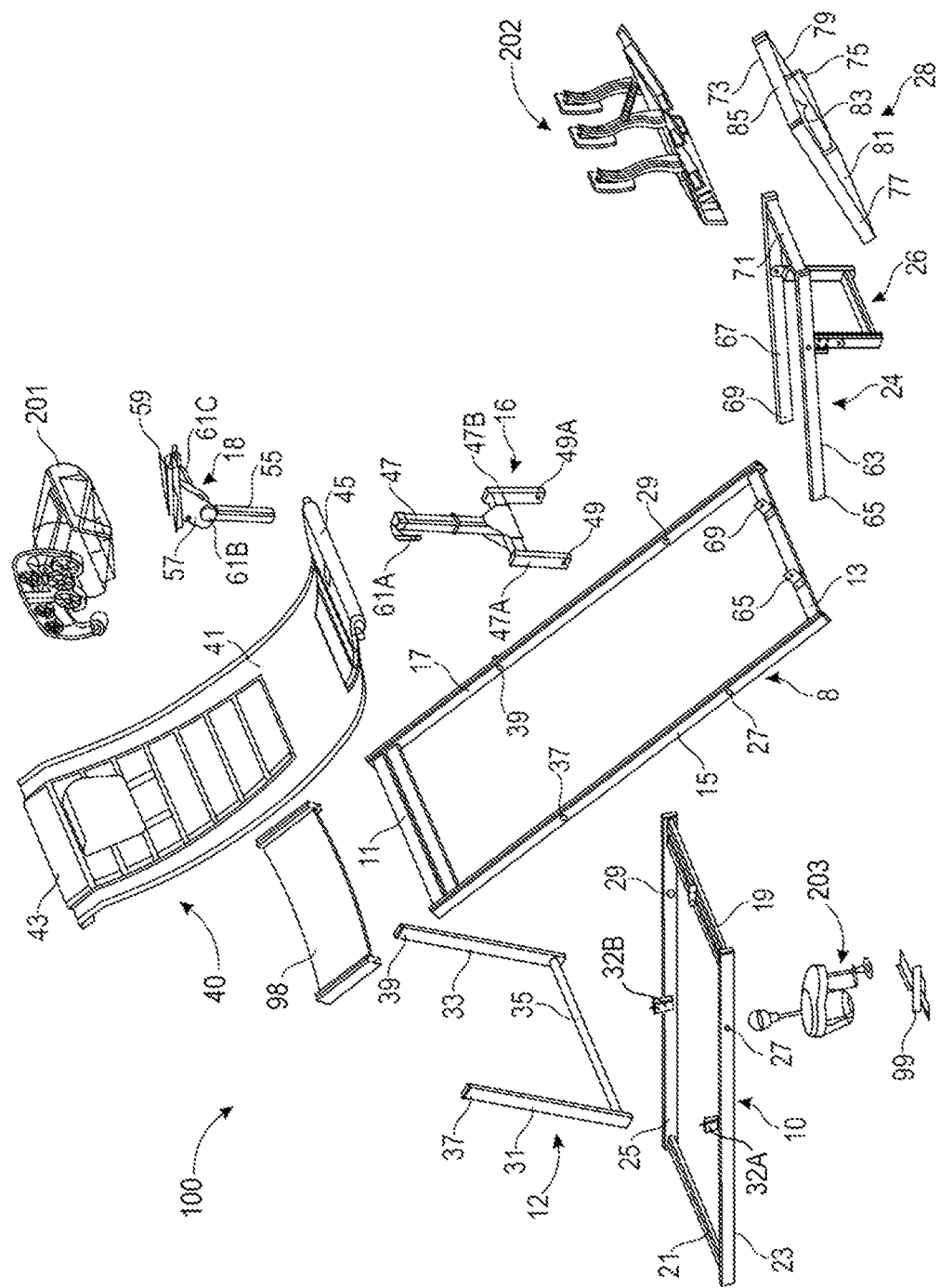
FIG. 3 shows a perspective exploded view of an example of a portable folding video game chair according to various embodiments described herein.
Figure 4:
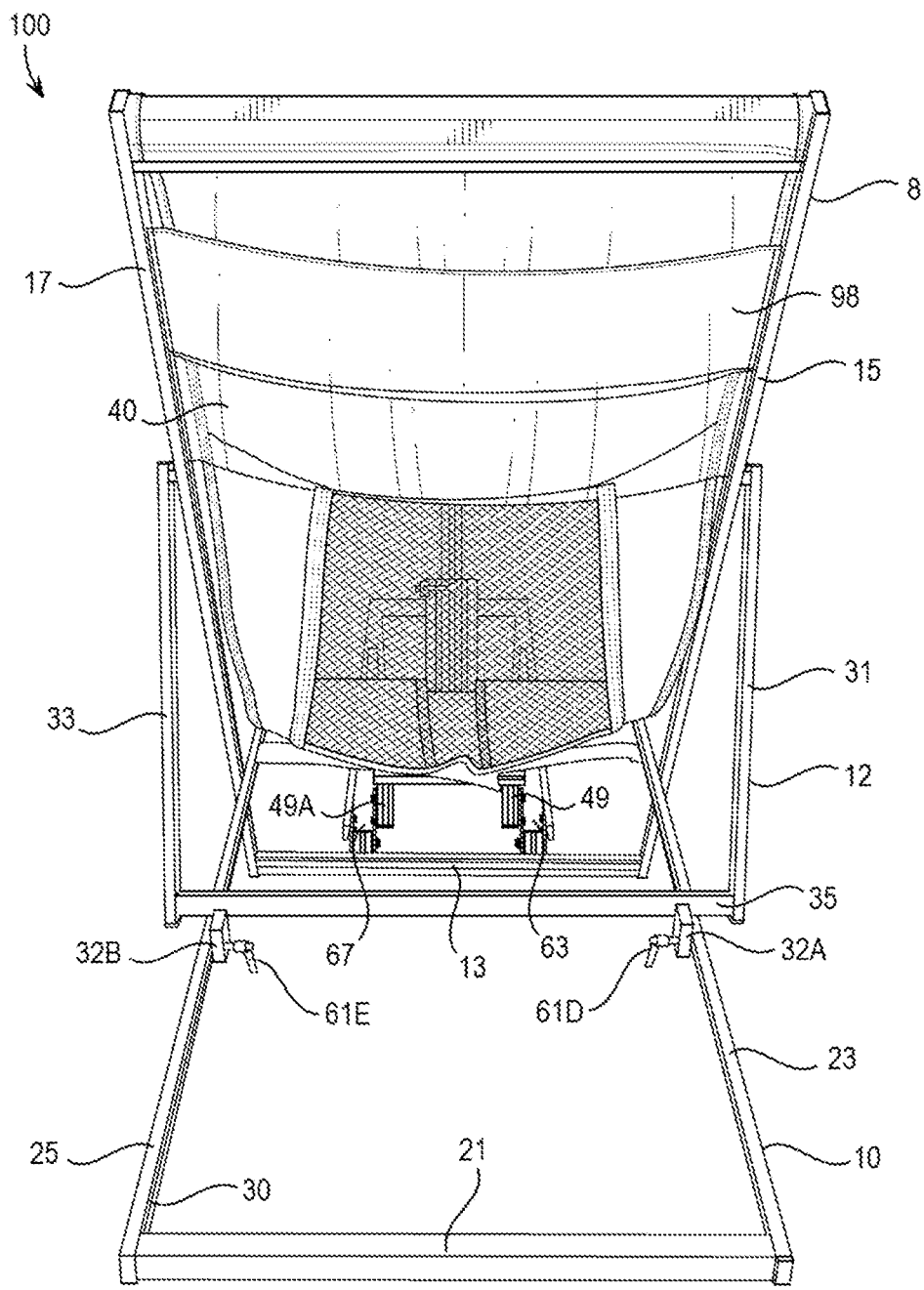
FIG. 4 depicts a rear perspective view of an example of a portable folding video game chair according to various embodiments described herein.
Figure 5:
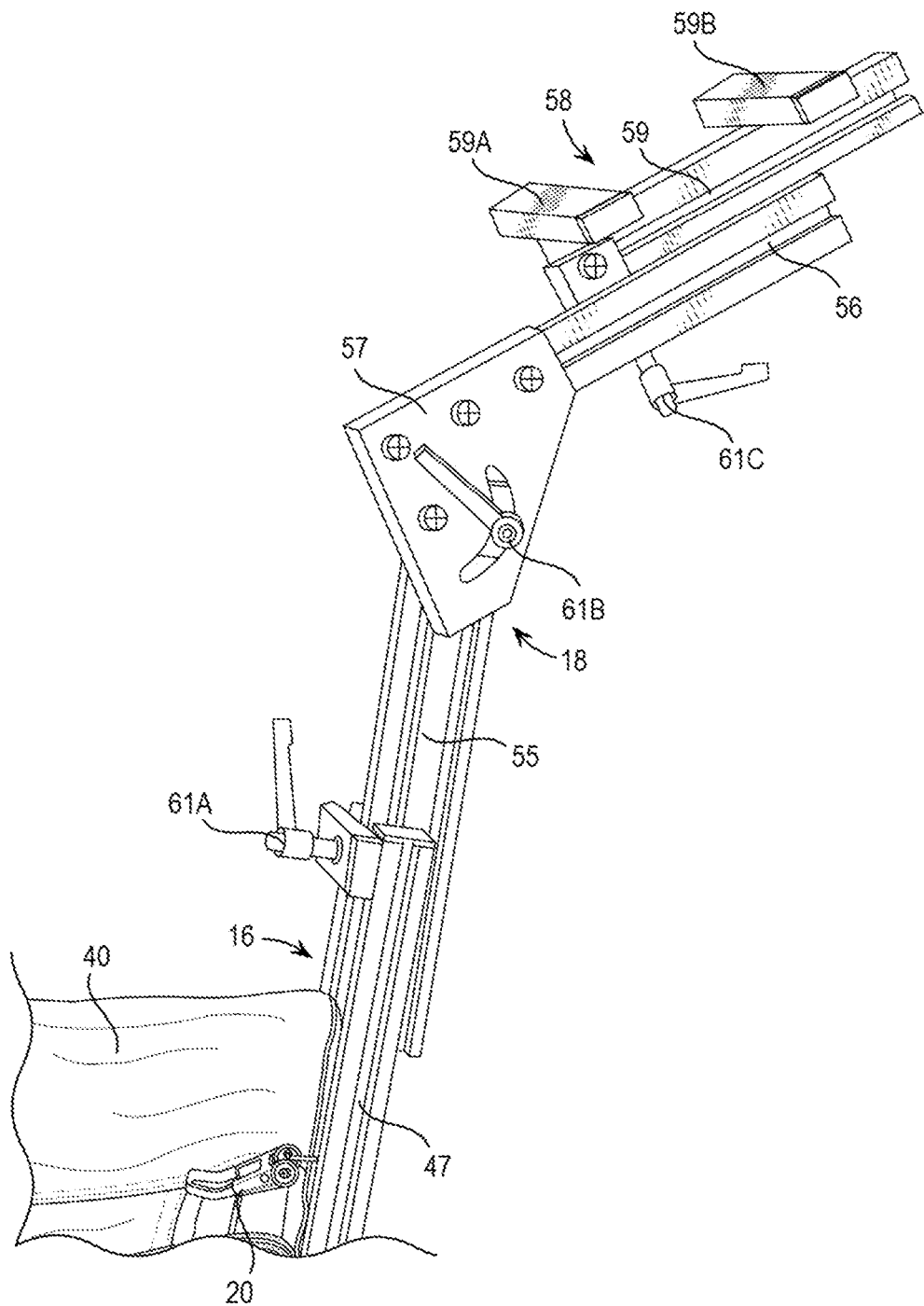
FIG. 5 illustrates a partial perspective view of an example steering wheel controller column and an example steering wheel controller column according to various embodiments described herein.

In preferred embodiments, the pedal controller frame 24 may be positioned in at least two positions. As shown in FIGS. 1, 7, 12, and 17 the pedal elevator 26 may be actuated or positioned to contact a floor and to raise the pedal controller frame 24 above the floor to simulate an open wheel driver position 5, in this embodiment the quick release pedals controller support 28 is supported in a higher position by the pedal elevator 26 elevating the pedal controller frame 24. As shown in FIGS. 2 and 16 the pedal elevator 26 may not be used or actuated so that the pedal controller frame 24 may rest on and contact a floor to simulate a close wheel driver position, in this embodiment the quick release pedals controller support 28 stay in a lower position closer to the floor.

In some embodiments, the chair 100 may comprise a quick released shifter controller support 99, which may be non-permanently mechanically fastened or removably coupled to the seating frame 10. In preferred embodiments, a shifter controller support 99 may be coupled to the front top crossbar 19. In further embodiments, a shifter controller support 99 may be coupled to the front top crossbar 19 and/or first rear leg 23 and/or to any other element of the chair 100. Preferably, a lever controller 203 (generally having a lever type controller interface, such as for simulating shifting, airplane throttle, etc.) may be secured or coupled to the quick released shifter controller support 99 by a fastener, such as a quick release fastener. The quick released shifter controller support 99 may be made from or may comprise any substantially rigid material that may include various types of metal, such as, for example, aluminum, wood, carbon fiber, plastics or any other suitable materials known to those skilled in the art or a combination of those known materials. In some embodiments the quick released shifter controller support 99, may be press stamped, assembled using welding, screwing, fastening, bending, or any other method.

Figure 6:
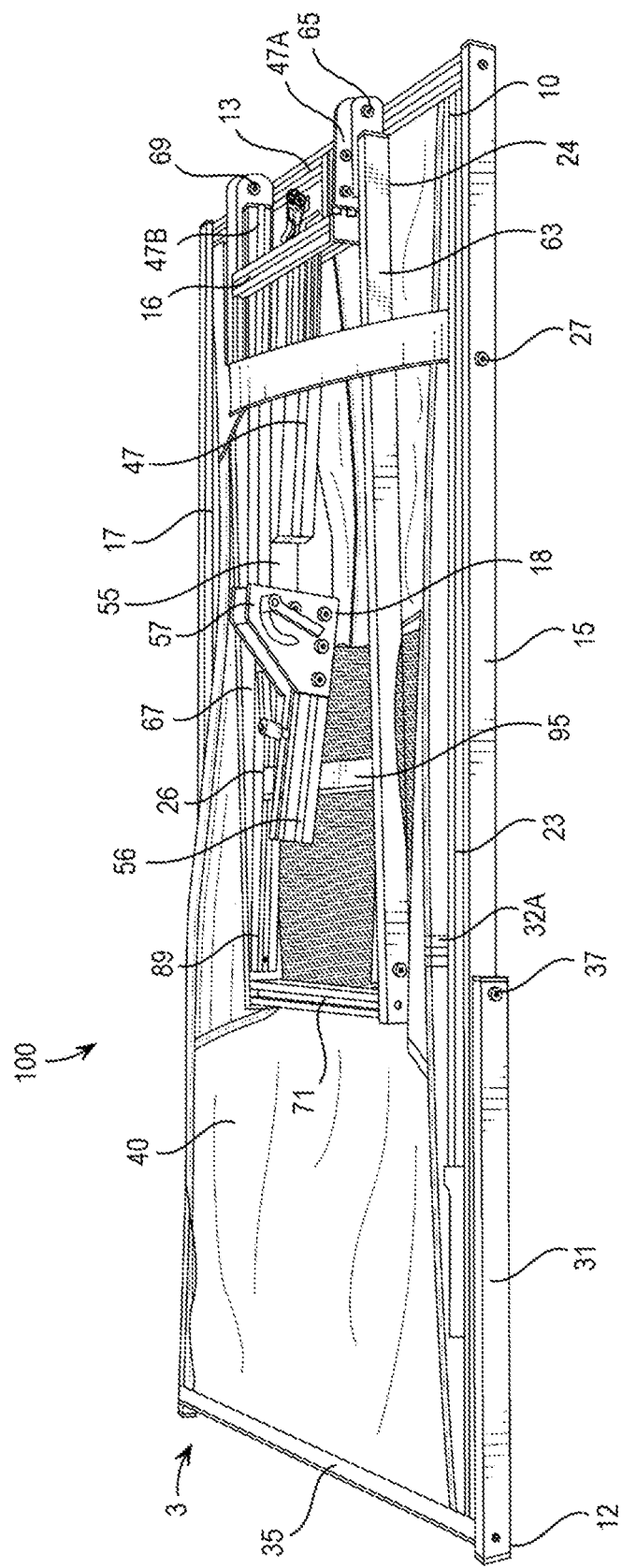
FIG. 6 shows a perspective view of an example of a portable folding video game chair in a storage configuration according to various embodiments described herein.
Figure 7:
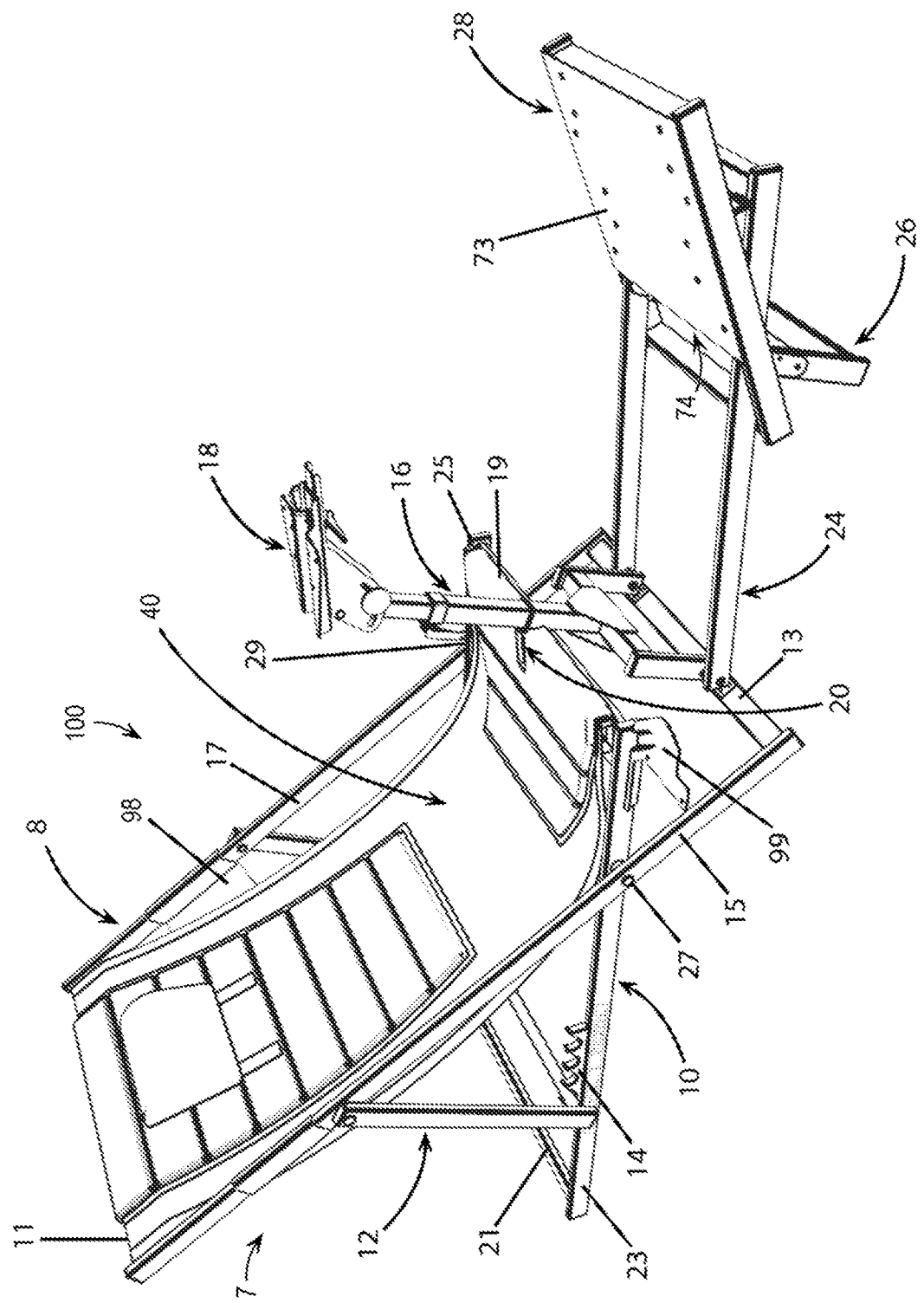
FIG. 7 depicts a perspective view of another example of a portable folding video game chair according to various embodiments described herein.

FIG. 6 shows a perspective view of the chair 100 in a storage configuration 3 ready to be shipped, picked up, or stored by the user 205. In preferred embodiments, the chair 100 may be movable into a storage configuration 3 in which the backrest frame 8 and seating frame 10 are positioned substantially within a single plane, and the chair 100 may be movable out of the storage configuration 3, such as into the open wheel configuration 5 and closed wheel configuration 7, so that the backrest frame 8 and seating frame 10 are not positioned substantially within the single plane as perhaps best shown in FIGS. 1, 2, 4, 7, 16, and 17. The steering wheel controller shaft 18 is depicted collapsed with the steering wheel controller column 16, and the pedal controller support 28 is slid off (not pictured in FIG. 6) of the collapsed pedal controller frame 24.

The portable folding video game chair 2, is designed to be shipped assembled, but a minimum assembly may be made by the video gamer or user 205 on the first use. As the game controllers 201, 202, 203, are not part of the present invention, they need to be fixed on the designated parts of the chair 100 forming new assembled parts herein described. The steering wheel controller 201 may be attached by fasteners, such as quick release fasteners, to quick release steering wheel horizontal adjuster 59, forming the new sub-assembly henceforward called steering wheel assembly 34. The pedal controller 202 may be attached by fasteners, such as quick release fasteners to the pedal controller support 28, forming the new sub-assembly henceforward called pedal assembly 36. The lever controller 203 may be attached by fasteners, such quick release fasteners, to the quick released shifter controller support 99, forming the new sub-assembly henceforward called shifter assembly 38. In embodiments for flight simulation the quick released shifter controller support 99 may receive joysticks in place of lever controller 203.

Referring to FIG. 6, the chair 100 in the storage configuration 3 is presented in a volume, which could be as minimal as, at least two times the backrest frame 8 height, at least the pitch selector 12 width, and at least the backrest frame 8 length plus the dimension exceeded of the assembly with the pitch selector 12. Creating a great advantage for shipping and storing the chair 100.

In preferred embodiments, the collapsing action of the chair 100 into the storage configuration 3 may begin with sliding off the pedal assembly 36 from the pedal controller support 28. Subsequently, sliding disconnected steering wheel assembly 34, and then detaching the shifter assembly 38 from the seat frame 10. Afterward, disconnecting the latch 20 from the steering wheel controller column 16, then disengaging the pitch selector 12 from the driver style selector 14, therefore, the chair 100 collapses to the floor. The steering wheel column 16, and the pedal controller frame 24 rotate over the front bottom crossbar 13 resting parallel to the collapsible sling chair 40.

Usually the steering wheel controllers 201, pedal controller 202, and lever controller 203 are wired or wireless communication with a video game console or computer, henceforward called video game machine. The video game machine plays the game simulator. Therefore, the chair 100 may preferably organize the controllers 201, 202, 203, close to the video game machine when is not in use. With the chair 100 neatly folded in the storage configuration 3, the video gamer user 205 can stealthily store the chair 100 in narrow spaces such as behind or under a sofa.

In preferred embodiments, the chair 100 may comprise one or more quick release fasteners 61A, 61B, 61C, 61D, 61E, which may be used to movably and/or removably couple two or more elements together. Preferably, a quick release fastener 61A, 61B, 61C, 61D, 61E, may be coupled to a first element and may comprise a cam lever that may be inserted into a channel 30, aperture, opening, etc., formed in a second element. By pivoting the cam lever in a first direction, the cam may clamp, lock fixedly couple, etc., the second element to the first element, and by pivoting the cam lever in a second direction, the cam may release the first and second elements so that one or both elements may be removed from each other and/or moved to a desired position relative to each other. However, it should be understood that a quick release fastener 61A, 61B, 61C, 61D, 61E, may comprise any type of fastener which may preferably by manipulated by the hand of a user 205 to lock together and unlock from each other two or more elements of the chair 100, such as threaded bolts and wingnuts, thumb studs, threaded levers, ball and detent couplings, or any other type of fastening device or method that is preferably manipulated without requiring tools.

While some exemplary shapes and sizes have been provided for elements of the chair 100, it should be understood to one of ordinary skill in the art that the collapsible sling chair 40, backrest frame 8, seating frame 10, pitch selector 12, steering wheel controller column 16, steering wheel controller shaft 18, pedal controller frame 24, quick release pedals controller support 28, back support 98, shifter controller support 99, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the chair 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the chair 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the chair 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the chair 100 may be coupled by being one of connected to and integrally formed with another element of the chair 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A portable folding video game chair, the chain comprising:
   a backrest frame having a first front leg, a second front leg, a rear top crossbar, and a front bottom crossbar, wherein the rear top crossbar couples an upper portion of the first front leg to an upper portion of the second front leg, and wherein the front bottom crossbar a lower portion of the first front leg a lower portion of the second front leg so that the first front leg and second front leg are parallel to each other;
   a seating frame having a first rear leg, a second rear leg, a front top crossbar, and a rear bottom crossbar, wherein the front top crossbar couples an upper portion of the first rear leg to an upper portion of the second rear leg, wherein the rear bottom crossbar couples a lower portion of the first rear leg to a lower portion of the second rear leg so that the first rear leg and second rear leg parallel to each other, and wherein the first rear leg is pivotally coupled to the first front leg and the second rear leg is pivotally coupled to the second front leg;

collapsible sling chair coupled to the front top crossbar and to the rear top crossbar;

a steering wheel controller column coupled to front bottom crossbar, the steering wheel controller column having a pole;

a steering wheel controller shaft having a steering wheel vertical adjuster shaft that is movably coupled to the pole of the steering wheel controller column;

a pedal controller frame having a first pedal controller rail, a second pedal controller rail, and a pedal controller frame crossbar, wherein the pedal controller frame crossbar couples an upper portion of the first pedal controller rail to an upper portion of the second pedal controller rail, and wherein a lower portion of the first pedal controller rail is coupled to the front bottom crossbar and a lower portion of the second pedal controller rail is coupled to the front bottom crossbar; and a quick release pedals controller support having a pedals controller support aperture, wherein the quick release pedals controller support is movably coupled to pedal controller frame by inserting the first pedal controller rail and second pedal controller rail through the pedals controller support aperture.

2. The chair of claim 1, wherein the steering wheel controller shaft is movably and removably coupled to steering wheel controller column via a quick release fastener.

3. The chair of claim 1, further comprising a pedal elevator that is pivotally coupled to pedal controller frame.

4. The chair of claim 1, wherein the steering wheel controller shaft comprises a steering wheel angle adjuster that allows a steering wheel controller that is coupled to the steering wheel controller shaft to pivot relative to the steering wheel vertical adjuster shaft.

5. The chair of claim 4, wherein the steering wheel controller shaft comprises a quick release steering wheel horizontal adjuster that is movably coupled to the steering wheel angle adjuster.

6. The chair of claim 5, wherein the quick release steering wheel horizontal adjuster is movably coupled to the steering wheel angle adjuster via a quick release fastener.

7. The chair of claim 1, further comprising a shifter controller support coupled to at least one of the first rear leg and front top crossbar.

8. The chair of claim 1, further comprising a latch that removably couples the pole of the steering wheel controller column to the front top crossbar.

9. The chair of claim 1, wherein the chair is movable into a storage configuration in which the backrest frame and seating frame are positioned substantially within a single plane, and wherein the chair is movable out of the storage configuration so that the backrest frame and seating frame are not positioned substantially within the single plane.

10. The chair of claim 1, further comprising a back support coupled to the first front leg and second front leg.

11. The chair of claim 10, wherein the back support is movably coupled to the first front leg and second front leg.

12. The chair of claim 1, wherein the collapsible sling chair comprises a flexible material.

13. The chair of claim 1, further comprising a pitch selector that is coupled to the first front leg and the second front leg, wherein the pitch selector is configured to rest on the first rear leg and the second rear leg to support the rear top crossbar a desired distance from the rear bottom crossbar.

14. The chair of claim 13, wherein the pitch selector is pivotally coupled to the first front leg and the second front leg.

15. The chair of claim 13, further comprising a retainer that is movably coupled to at least one or the first rear leg and second rear leg wherein the retainer is configured to arrest movement of the pitch selector to maintain the rear top crossbar a desired distance from the rear bottom crossbar.

16. The chair of claim 15, wherein the chair is movable between an open wheel configuration and a closed wheel configuration, wherein the chair is maintained in the open wheel configuration by positioning the retainer relatively closer to the rear bottom crossbar, and wherein the chair is maintained in the closed wheel configuration by positioning the retainer relatively farther from the rear bottom crossbar.

17. The chair of claim 15, wherein the retainer is coupled to at least one or the first rear leg and second rear leg via a quick release fastener.

18. The chair of claim 1, wherein the pedal controller frame is pivotally coupled to at least one of the backrest frame and the steering wheel controller column.

19. The chair of claim 1, wherein the steering wheel controller column is pivotally coupled to the front bottom crossbar.

20. The chair of claim 1, wherein the quick release pedals controller support comprises a first rail leg, a second rail leg, a foot crossbar, and a mid crossbar, wherein the foot crossbar couples a lower portion of the first rail leg to a lower portion of the second rail leg, wherein the mid crossbar couples an upper portion of the first rail leg to an upper portion of the second rail leg, and wherein the pedals controller support aperture is bounded by the first rail leg, second rail leg, foot crossbar, and mid crossbar.

* * * * *